Patented Jan. 6, 1931

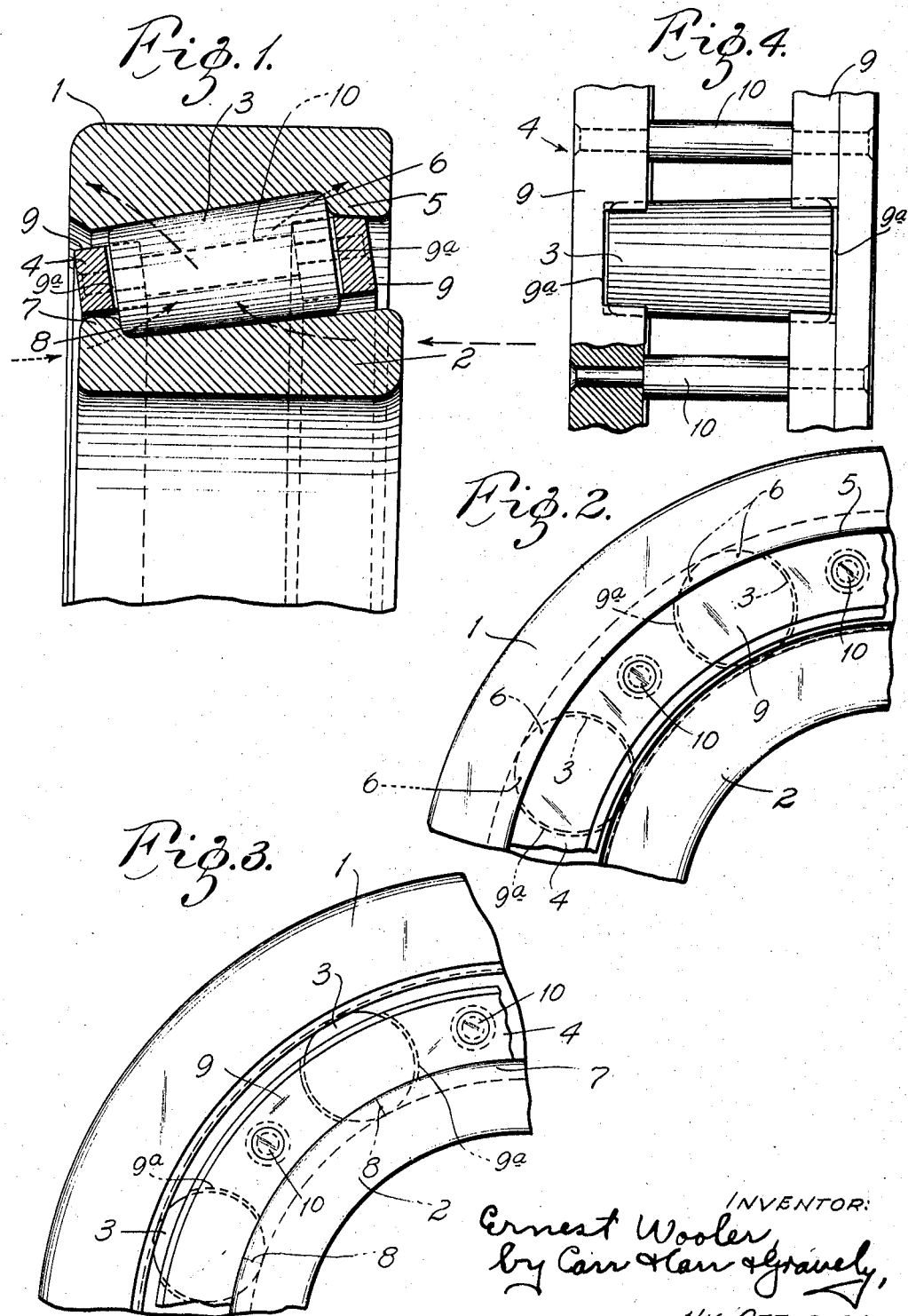

1,787,712

UNITED STATES PATENT OFFICE

ERNEST WOOLER, OF CANTON, OHIO, ASSIGNOR TO THE TIMKEN ROLLER BEARING COMPANY, OF CANTON, OHIO, A CORPORATION OF OHIO

ROLLER BEARING

Application filed December 24, 1928. Serial No. 328,108.

My invention relates to roller bearings, particularly taper roller bearings and it has for its principal object a single roll self-contained taper roller bearing capable of withstanding thrust in opposite directions as well as being capable of carrying radial load.

The invention consists in the roller bearing and in the parts and combinations and arrangements of parts hereinafter described and claimed.

In the accompanying drawing,

Fig. 1 is a half sectional view of a taper roller bearing embodying my invention, Fig. 2 is a partial end view, looking at the large ends of the rolls, Fig. 3 is a similar view looking at the small ends of the rolls, and Fig. 4 is a fragmentary plan view of the cage.

The tapered roller bearing illustrated in the drawing comprises a cup 1 or outer bearing member, a cone 2 or inner bearing member, conical rolls 3 therebetween and a cage indicated generally by the numeral 4 that spaces said rolls apart.

The cup 1 has an internal annular rib 5 at the large end of its conical raceway, said rib 5 preferably being undercut (that is making an angle slightly less than 90° with the raceway or bearing surface of the cup) so as to contact at two points 6 with the large ends of the conical rolls 3.

The bearing cone 2 has an external annular rib 7 at the small end of its conical raceway, said rib preferably making an angle of slightly more than 90° with said raceway, so as to contact with the small end of each roll along a line 8 extending radially of said roll end.

The cage comprises end rings 9 connected by pins 10 that have their ends upset in holes in said rings 9. Each end ring has depressions 9a in which the ends of the rolls 3 rest. Thus the rolls are positioned by the end rings, the pins 10 not being in contact therewith. The large end ring 9 fits snugly in the circle defined by the top of the rib 5 at the large end of the cup 1; and the small end ring 9 closely encircles the top of the rib 7 at the small end of the cone 2. Thus if the cage pockets become slightly enlarged by wear, the cage will be guided by contact of the small end ring 9 with the cone rib 7 and the large end ring 9 with the cup rib 5.

The above described bearing is capable of carrying a radial load and also of withstanding end thrust in both directions. End thrust originating at the small ends of the rolls traces the path shown by the dotted line, passing from the cone rib 7 to the rolls 3 and diagonally through the rolls 3 to the cup rib 5. When the end thrust is in this direction, both the cone rib 7 and the cup rib 5 contact with the rolls 3.

End thrust originating at the large ends of the rolls follows the course shown by the dash line, passing through the body of the cone 2, through the bodies of the rolls 3 and to the body of the cup 1. When the thrust is in this direction the cone rib 7 has slight, if any, contact with the ends of the rolls; but the cup rib 5 maintains its guiding contact with the large ends of the rolls, even though the thrust is taken up in the body of the cup and not on the cup rib.

The bearing is assembled by placing the rolls 3 between the cup 1 and cone 2, spreading the rolls apart and assembling the cage 4. After the cage has been assembled the parts are locked together and the bearing is self contained.

The above described bearing has the important advantage of being self-contained, of withstanding end thrust in both directions and of providing guiding contact for both ends of the rolls. Eliminating the usual rib at the large end of the cone makes a material saving in metal.

What I claim is:

1. A single row self-contained taper roller bearing comprising an outer bearing cup having an internal conical raceway and an internal annular rib at the large end of said raceway, an inner bearing cone having an external conical raceway and an external annular rib at the small end of said raceway, and taper rolls between said cup and cone with their large ends abutting against said cup rib and their small ends abutting against said cone rib.

2. A single row self-contained taper roller bearing comprising an outer bearing cup having an internal conical raceway and an internal annular rib at the large end of said raceway only, an inner bearing cone having an external conical raceway and an external annular rib at the small end of said raceway only, and taper rolls between said cup and cone with their large ends abutting against said cup rib and their small ends abutting against said cone rib.

3. A single row self-contained taper roller bearing comprising an outer bearing cup having an internal conical raceway and an internal annular rib at the large end of said raceway only, an inner bearing cone having an external conical raceway and an external annular rib at the small end of said raceway only, and taper rolls between said cup and cone, the large ends of said rolls having two point contact with said cup rib and the small ends of said rolls having radial line contact with said cone rib.

4. A single row self-contained taper roller bearing comprising an outer bearing cup having an internal conical raceway and an internal annular rib at the large end of said raceway, an inner bearing cone having an external conical raceway and an external annular rib at the small end of said raceway, taper rolls between said cup and cone with their large ends abutting against said cup rib and their small ends abutting against said cone rib and a cage for holding said rolls in spaced relation, said cage comprising end rings having pockets formed therein.

5. A single row self-contained taper roller bearing comprising an outer bearing cup having an internal conical raceway and an internal annular rib at the large end of said raceway only, an inner bearing cone having an external conical raceway and an external annular rib at the small end of said raceway only, taper rolls between said cup and cone, the large ends of said rolls having two point contact with said cup rib and the small ends of said rolls having radial line contact with said cone rib and a cage for holding said rolls in spaced relation, said cage comprising end rings having pockets therein.

6. A single row self-contained taper roller bearing comprising an outer bearing cup having an internal conical raceway and an internal annular rib at the large end of said raceway only, an inner bearing cone having an external conical raceway and an external annular rib at the small end of said raceway only, taper rolls between said cup and cone with their large ends abutting against said cup rib and their small ends abutting against said cone rib and a conical cage for said rolls comprising end rings and spacing bridges connecting said end rings, the large end ring being spaced only a slight distance away from said cup rib and the small end ring being spaced only a slight distance away from said cone rib, whereby wear of the cage will cause it to be guided by contact with said ribs.

7. A single row self-contained taper roller bearing comprising an outer bearing cup having an internal conical raceway and an internal annular rib at the large end of said raceway, an inner bearing cone having an external conical raceway and an external annular rib at the small end of said raceway, taper rolls between said cup and cone with their large ends abutting against said cup rib and their small ends abutting against said cone rib and a cage for holding said rolls in spaced relation, said cage comprising end rings having pockets formed therein, the side marginal portions of said pockets being curved to conform to said rolls.

Signed at Canton, Ohio, this 19th day of December, 1928.

ERNEST WOOLER.